3,108,002
ACID COMPOSITION

Stanley P. Raffensperger, Palos Park, and Thomas T. Takashima, La Grange, Ill., assignors to General Foods Corporation, White Plains, N.Y., a corporation of Delaware
No Drawing. Filed June 27, 1961, Ser. No. 119,803
13 Claims. (Cl. 99—78)

The following invention relates to an improved method of increasing the solubility rate of adipic and fumaric acid in cold water.

In the past, citric acid has been employed as an acidulant in dry beverage mixes capable of being dissolved in cold water. In addition to citric acid, such mixes usually contain other hydroscopic materials such as sugars and the like. Such compositions are relatively unstable if stored for extended periods of time since they readily absorb moisture and cake upon standing. The storage problem encountered with such dry beverage mixes has always been of great concern to those skilled-in-the-art and in particular the storage problems encountered in warm, humid climates. Adipic and fumaric acid have many properties which make them desirable for commercial use in such products. However, such uses are limited due to the fact that both adipic and fumaric acid have a very low rate of solubility in cold water. While the dry beverage mixes of commerce must dissolve in cold water in less than one minute, the use of adipic or fumaric acid in such mixes in the past has been impossible due to the fact that the adipic and fumaric acid do not dissolve rapidly in cold water, periods as long as twenty-four hours at times not being sufficient to put all of the adipic or fumaric acid into solution.

It is an object of this invention to prepare an adipic or fumaric acid composition which has an increased rate of solubility in cold water. It is a further object of this invention to prepare an adipic or fumaric acid composition which when used in cold water soluble products will not absorb substantial amounts of moisture upon standing and will be readily and easily soluble in cold water. It is a further object of this invention to prepare an adipic or fumaric acid composition which when used in cold water soluble beverage mixes will prevent the occurrence of chemical reactions during storage which cause degradation of the beverage flavor and color. It is still a further object of this invention to prepare an adipic or fumaric acid composition which when used in cold water soluble beverage mixes containing sucrose will prevent the undesirable inversion of the sucrose. Further objects of this invention will be apparent from a reading of the specification.

It has now been discovered that the rate of solubility of adipic and fumaric acid may be increased by mixing fumaric acid with an alkyl aryl sulfonate. It is not known exactly how or why these derivatives improve the rate of solubility of adipic or fumaric acid, but it is believed that these derivatives have a solubilizing effect over and above that effect obtained by reducing adipic or fumaric acid to a fine powder.

As used in the present invention the term "acid" refers to an acid selected from the group consisting of adipic and fumaric acids.

While any water soluble derivative may be employed, it is preferred to employ sodium dodecyl benzene sulfonate (Santomerse 85).

In producing the acid compositions according to certain aspects of this invention, the acid is preferably ground to effect size reduction, typically particle sizes of about 40 to 400 U.S. standard mesh are desirable and preferably a particle size of about 100–300 U.S. standard mesh.

For each part by weight of acid about 0.05 to 4.5% of alkyl aryl sulfonate may be employed and preferably 0.1 to 1.5%. The so ground acid may then be mixed with the sodium dodecyl benzene sulfonate, although other alkyl aryl sulfonates may be employed. The acid and sodium dodecyl benzene sulfonate are blended and then ground to reduce the particle size so that the particles will pass through about a 100 to 400 U.S. standard mesh screen and preferably 100% through a 300 U.S. standard mesh screen.

The following examples illustrate several embodiments of the present invention, but is is to be understood that these examples are for purposes of illustration only, and that the invention is not limited thereto since various changes can be made by those skilled-in-the-art without departing from its scope and spirit.

Example I

Five hundred pounds of fumaric acid having a mesh size of 100 U.S. standard mesh was mixed with 7.5 pounds of sodium dodecyl benzene sulfonate. The mixture was well blended and then ground to reduce the size of the fumaric acid particles to a size which passed through a 200 U.S. standard mesh screen.

Example II

Two-hundred fifty pounds of fumaric acid having a mesh size of 100 U.S. standard mesh was mixed with 0.34 pound of sodium dodecyl benzene sulfonate which had previously been dissolved in 25 pounds of warm water. The mixture of acid, water and sodium dodecyl benzene sulfonate was well blended and then ground to reduce the size of the fumaric acid particles to a size which passed through a 200 U.S. standard mesh screen.

The untreated fumaric acid has a solubility rate of 3.2 grams per two quarts of water in 15 to 20 minutes when dissolved in water at 45° F. whereas the fumaric acid composition prepared according to Examples I and II had a solubility rate of about 2.9 grams per two quarts of water in one to three minutes when dissolved in water at 45° F.

The acid composition of the present invention may be employed wherever it is desired to utilize adipic or fumaric acid in cold water where a relatively rapid rate of solubility is required. One such use is in fruit flavored beverage mixes which are dissolved in very cold water. Such mixes typically contain sugars, an edible acid, flavoring and coloring. A typical fruit flavored beverage mix composition as employed in this invention is:

| | Parts by weight |
|---|---|
| Fumaric acid | 14.00–29.00 |
| Fruit flavor (natural or imitation, fixed in gum arabic) | .25–1.75 |
| Color (FD & C, certified food coloring) | .10–1.25 |
| Dextrose hydrate or sucrose sufficient to bring the total parts by weight to 100. | |

17.7 grams of the above mix may be dissolved in two quarts of cold water and to this solution may be added 1–1.5 cups of sugar to prepare a fruit flavored beverage. As an alternative, the sugar may be incorporated in the dry beverage mix rather than being added after the mix has been dissolved.

Fruit flavored beverage mixes which contain the fumaric acid composition of the present invention in combination with a hydroscopic sugar such as sucrose or the like exhibit little or no caking after extended periods of storage, and after such time, can be dissolved in cold water within several minutes. When the fumaric acid composition of the present invention is employed in fruit flavored beverage mixes which contain sucrose, flavoring, coloring and the fumaric acid composition as a substitute for citric acid, it is possible to reduce the total weight of acid about 25–35% while obtaining a beverage equally acceptable in taste. Furthermore, where dextrose is employed as the filler in such beverage mixes, it may be employed at lower levels when the fumaric acid composition of the present invention is used as a replacement for citric acid.

What is claimed is:

1. A method of improving the cold water solubility rate of an acid selected from the group consisting of adipic acid and fumaric acid which comprises mixing a water soluble alkyl aryl sulfonate with said acid, said acid having a particle size of 40–400 U.S. standard mesh, said alkyl aryl sulfonate being employed at a level of 0.05 to 4.5% by weight of said acid.

2. A method of improving the cold water solubility rate of an acid selected from the group consisting of adipic acid and fumaric acid which comprises mixing a water soluble alkyl aryl sulfonate with said acid and finely grinding said mixture to a particle size of 40–400 U.S. standard mesh, said alkyl aryl sulfonate being employed at a level of 0.05 to 4.5% by weight of said acid.

3. A method of improving the cold water solubility rate of an acid selected from the group consisting of adipic acid and fumaric acid which comprises coating a water soluble alkyl aryl sulfonate on said acid and finely grinding said coated acid to a particle size of 40–400 U.S. standard mesh, said alkyl aryl sulfonate being employed at a level of 0.05 to 4.5% by weight of said acid.

4. A method according to claim 3 wherein said coated acid is ground to the extent that 100% passes through a 300 U.S. standard mesh screen.

5. A method according to claim 3 wherein said alkyl aryl sulfonate is sodium dodecyl benzene sulfonate.

6. A fumaric acid-containing composition having an increased rate of solubility in cold water which comprises a finely ground fumaric acid powder coated with a water soluble alkyl aryl sulfonate, said alkyl aryl sulfonate being employed at a level of 0.05 to 4.5% by weight of said acid, said composition having a particle size of 40–400 U.S. standard mesh.

7. An adipic acid-containing composition having an increased rate of solubility in cold water which comprises a finely ground adipic acid powder coated with a water soluble alkyl aryl sulfonate, said alkyl aryl sulfonate being employed at a level of 0.05 to 4.5% by weight of said acid, said composition having a particle size of 40–400 U.S. standard mesh.

8. A fumaric acid-containing composition having an increased rate of solubility in cold water which comprises a fumaric acid powder coated with 0.05 to 4.5% of a water soluble aryl alkyl sulfonate by weight of the fumaric acid, said composition having a particle size of 40–400 U.S. standard mesh.

9. An adipic acid-containing composition having an increased rate of solubility in cold water which comprises an adipic acid powder coated with 0.05 to 4.5% of a water soluble aryl alkyl sulfonate by weight of the adipic acid, said composition having a particle size of 40–400 U.S. standard mesh.

10. A fumaric acid-containing composition having an increased rate of solubility in cold water which comprises a fumaric acid powder coated with 0.1 to 1.5% sodium dodecyl benzene sulfonate by weight of the fumaric acid, said composition having a particle size of 40–400 U.S. standard mesh.

11. An adipic acid-containing composition having an increased rate of solubility in cold water which comprises an adipic acid powder coated with 0.1 to 1.5% sodium dodecyl benzene sulfonate by weight of the adipic acid, said composition having a particle size of 40–400 U.S. standard mesh.

12. A cold water soluble fruit flavored beverage mix which comprises 14.0–29.0 parts by weight of a fumaric acid-containing composition having an increased rate of solubility in cold water comprised of finely ground fumaric acid powder coated with a water soluble alkyl aryl sulfonate, said coated fumaric acid powder having a particle size of 40–400 U.S. standard mesh, .25–1.75 parts by weight of fixed fruit flavor, .10–1.25 parts by weight of color and sufficient dextrose hydrate to bring the total parts by weight to 100, said alkyl aryl sulfonate being employed at a level of 0.05 to 4.5% by weight of said acid.

13. A cold water soluble fruit flavored beverage mix which comprises 14.0–29.0 parts by weight of an adipic acid-containing composition having an increased rate of solubility in cold water comprised of finely ground adipic acid powder coated with a water soluble alkyl aryl sulfonate, said coated adipic acid powder having a particle size of 40–400 U.S. standard mesh, .25–1.75 parts by weight of fixed fruit flavor, .10–1.25 parts by weight of color and sufficient dextrose hydrate to bring the total parts by weight to 100, said alkyl aryl sulfonate being employed at a level of 0.05 to 4.5% by weight of said acid.

References Cited in the file of this patent

UNITED STATES PATENTS 2,982,653    Block _____ May 2, 1961